United States Patent [19]

Wheatley

[11] Patent Number: 4,572,140
[45] Date of Patent: Feb. 25, 1986

[54] NITROUS OXIDE PRECOOLER

[75] Inventor: William M. Wheatley, Columbia, S.C.

[73] Assignee: Ram Automotive Company, Canton, Ohio

[21] Appl. No.: 658,667

[22] Filed: Oct. 9, 1984

[51] Int. Cl.[4] .................. F02B 75/10; F02M 31/20
[52] U.S. Cl. .................. 123/541; 123/1 A; 123/198 A
[58] Field of Search .......... 123/541, 1 A, 198 A, 123/575, 525, 527; 62/7

[56] References Cited

U.S. PATENT DOCUMENTS

| 2,715,395 | 8/1955 | Finvold | 123/1 A |
| 3,593,694 | 7/1971 | Hilborn | 123/541 |
| 3,602,202 | 8/1971 | Kobayashi | 123/1 A |
| 4,308,827 | 1/1982 | Roe | 123/541 |
| 4,494,488 | 1/1985 | Wheatley | 123/1 A |
| 4,503,832 | 3/1985 | Petley | 123/1 A |

OTHER PUBLICATIONS

Advertising Brochure entitled "Nitrouscharging by Ice".

Primary Examiner—Ronald H. Lazarus
Attorney, Agent, or Firm—Michael Sand Co.

[57] ABSTRACT

A device used with a fuel charging system in which nitrous oxide is injected into the engine to provide a sudden burst of power to the vehicle. A pressurized cylinder of liquid nitrous oxide is connected to the engine through a delivery conduit and a solenoid valve. A jacket preferably formed of a silicone hose is placed about a portion of the delivery conduit forming a cooling chamber about the conduit. A manifold closes one end of the cooling chamber and an orifice block closes the other end. First and second solenoid valves are connected to the manifold. The first valve purges gaseous nitrous oxide from the delivery conduit and injects it into the cooling chamber where the expanding gas lowers the temperature of the nitrous oxide in the conduit to maintain it in a liquid state prior to being injected into the vehicle engine upon actuation of the second solenoid valve. Heretofore, the gaseous nitrous oxide in the delivery conduit was vented to the atmosphere instead of being returned to the cooling chamber to assist in maintaining the incoming nitrous oxide in a liquid state.

13 Claims, 5 Drawing Figures

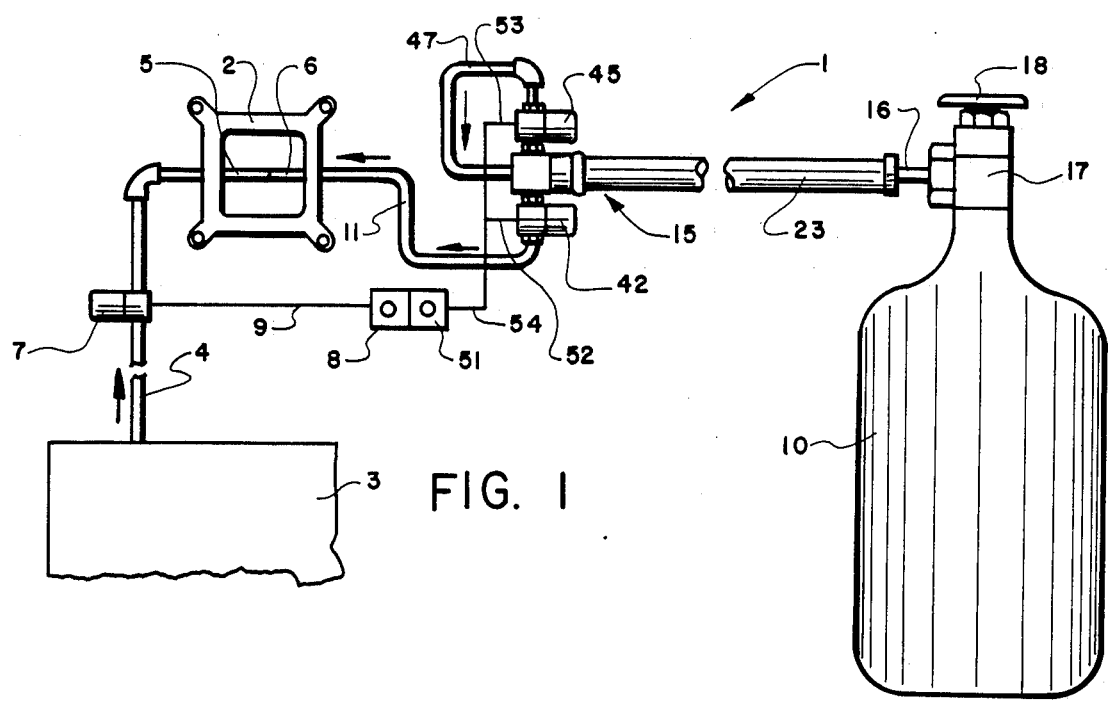
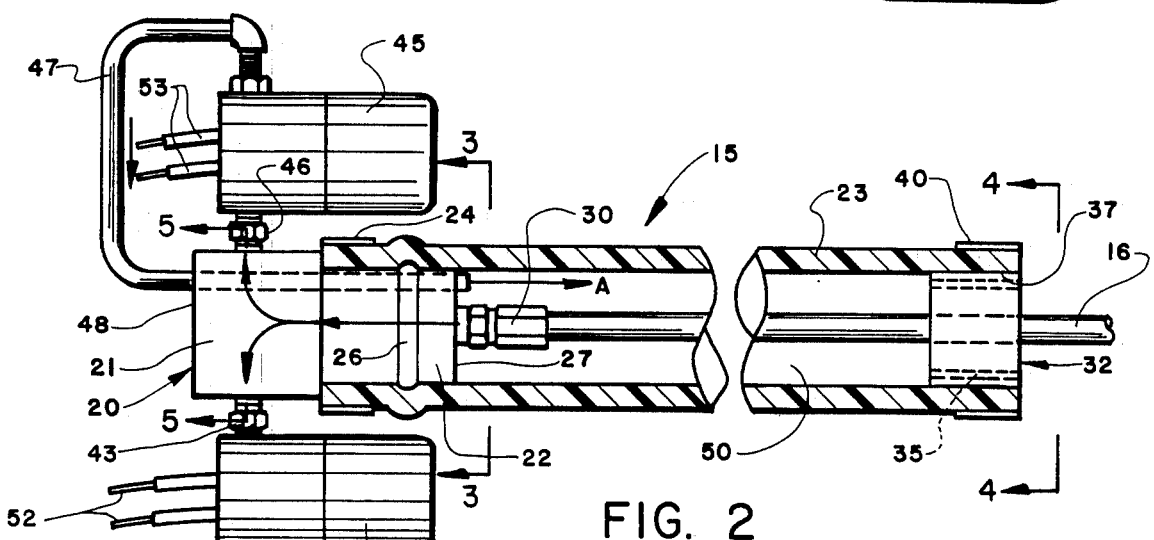
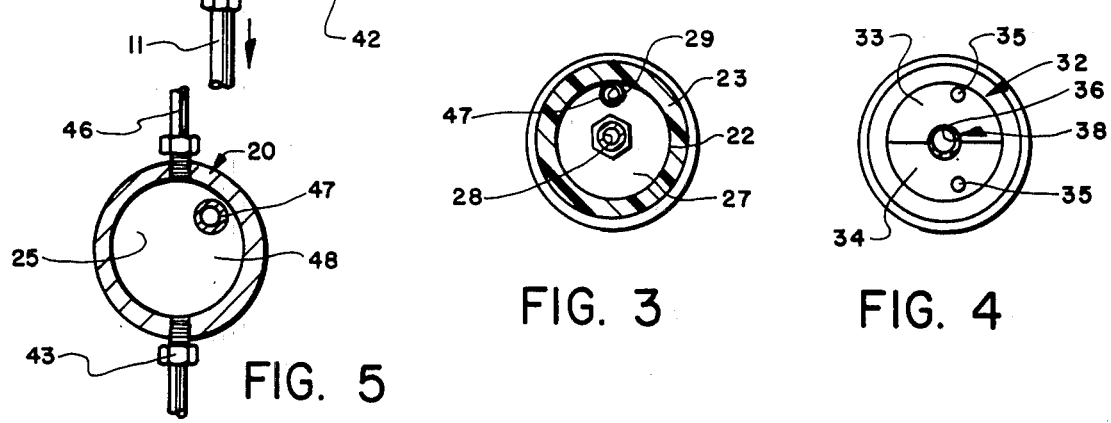

NITROUS OXIDE PRECOOLER

TECHNICAL FIELD

The invention relates to a fuel charging system and in particular to a system in which liquid nitrous oxide is supplied to the engine of a high performance vehicle for obtaining a sudden burst of power during a race. More particularly, the invention relates to a fuel charging system in which the liquid nitrous oxide in the engine supply conduit is cooled and maintained in a liquid state by purging any vaporized nitrous oxide in the supply conduit and injecting it into a cooling chamber surrounding the supply conduit.

BACKGROUND ART

The chemical supercharging of racing engines has been used for some time in the racing and high performance vehicle industry for applying a sudden burst of power to the vehicle engine for increased engine horsepower and torque. One type of chemical supercharging is accomplished with nitrous oxide which is a chemical compound of nitrogen and oxygen commonly known as an oxidizer. Nitrous oxide when under sufficient pressure is in liquid form and when exposed to the heat of combustion in the engine it disassociates into its free elements of oxygen and nitrogen. When the nitrous oxide is injected into an internal combustion engine, it will create a very lean condition in the combustion chamber. This is alleviated by injecting additional fuel into the engine simultaneously with the nitrous oxide. When this is accomplished, the vehicle has an instant power gain and will deliver increased horsepower and torque to the engine. This will provide a sudden burst of power to the vehicle for use in the final stretch of a race or for passing another vehicle at a critical time in the race.

Nitrous oxide charging systems usually consist of a cylinder or container holding a supply of liquid nitrous oxide under pressure, for example approximately 900 psi. The nitrous oxide cylinder is connected by a conduit or supply line to the carburetor of the engine and has a solenoid actuated valve in the conduit for controlling the flow of the liquid nitrous oxide. The solenoid valve is operated by the driver from within the vehicle when the sudden burst of power is desired.

The nitrous oxide is maintained at this high pressure so that it will remain in a liquid state when it enters the carburetor to achieve the proper mixture of the oxygen, which is released by the nitrous oxide, with the fuel being supplied simultaneously to the carburetor through a fuel delivery line. The nitrous oxide cylinder is connected to a delivery solenoid by a section of conduit or tubing usually several feet long. This presents a problem in that the liquid nitrous oxide in the delivery conduit will vaporize before being injected into the vehicle engine upon actuation of the delivery solenoid by the vehicle driver. This results in an improper fuel mixture reducing the effectiveness of the fuel charging system. In order to eliminate this problem of the nitrous oxide vapors in the incoming line from entering the engine, a purge valve is actuated by the driver just prior to injecting the liquid nitrous oxide into the engine. This purge valve will vent the gaseous nitrous oxide in the delivery conduit to the atmosphere before energizing the delivery solenoid. Although this arrangement works relatively satisfactory, the gaseous nitrous oxide is vented to the surrounding atmosphere without any use being made of it. Also, the lower the temperature of the liquid nitrous oxide greater will be its density allowing more nitrous oxide to pass through the system for a given line pressure which provides for an increased boost of power when the liquid nitrous oxide is expanded to a gas in the vehicle engine.

Therefore, the need has existed for a device which precools and maintains the liquid nitrous oxide in the incoming delivery conduit at the lowest temperature possible to maintain the incoming nitrous oxide in liquid form prior to it being injected into the engine by actuation of the solenoid valve in the delivery conduit.

DISCLOSURE OF THE INVENTION

Objectives of the invention include providing a nitrous oxide precooler for a fuel charging system for a vehicle engine which precools the liquid nitrous oxide located in the incoming delivery conduit before it passes through the electric solenoid actuated valve and into the engine in order to increase the density of the liquid nitrous oxide, allowing more nitrous oxide to pass through the system for a given line pressure. Another objective is to provide such a precooler in which the vaporized nitrous oxide that forms in the delivery conduit prior to actuation of the delivery solenoid is purged from the delivery conduit and returned to and expanded within a chamber surrounding the delivery conduit for cooling the nitrous oxide therein.

Another objective of the invention is to provide such a precooler which is formed by a section of hose which surrounds a portion of the delivery conduit adjacent the solenoid valve to form an annular cooling chamber about the delivery conduit, and in which the hose is closed at one end by an orifice block and at the other end by a manifold. A further objective is to provide such a device in which the orifice block enables vaporized and spent nitrous oxide to be discharged from within the cooling chamber, and in which a pair of solenoids are connected to the manifold, one of which controls the flow of liquid nitrous oxide from the delivery conduit to the engine and the other of which purges the vaporized nitrous oxide from the delivery conduit and injects it into the cooling chamber.

Another objective of the invention is to provide such a precooler which is extremely durable and efficient and which is formed from a relatively few number of components including existing solenoid actuated control valves; and which forms the cooling chamber by an inexpensive, preferably silicone hose, which extends a predetermined distance telescopically mounted about the nitrous oxide supply conduit. A still further objective is to provide such a precooler which uses the nitrous oxide vapors which heretofore were ejected into the atmosphere for achieving the cooling effect thereby eliminating the use of any additional nitrous oxide or other chemicals, and without materially increasing the weight of the fuel charging system which is critical in a racing vehicle.

These objectives and advantages are obtained by the improved nitrous oxide precooler of the invention which is adapted for use with a fuel charging system for vehicle engines, the general nature of said precooler may be stated as including a container holding a supply of pressurized liquid nitrous oxide; conduit means for delivering nitrous oxide from the container to the vehicle engine; first valve means for controlling the flow of nitrous oxide from the conduit means to the engine;

jacket means surrounding a portion of the conduit means for forming a cooling chamber to receive gaseous nitrous oxide for maintaining the nitrous oxide in the conduit means in a liquid state; and second valve means communicating with the conduit means and cooling chamber for purging any gaseous nitrous oxide from the conduit means and injecting it into said cooling chamber before actuation of the first valve means.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

FIG. 1 is a diagrammatic perspective view of a fuel charging system having the nitrous oxide precooler therein;

FIG. 2 is an enlarged fragmentary view with portions broken away and in section, showing the nitrous oxide precooler of the invention;

FIG. 3 is a sectional view taken on line 3—3, FIG. 2;

FIG. 4 is a sectional view taken on line 4—4, FIG. 2; and

FIG. 5 is a sectional view taken on line 5—5, FIG. 2.

Similar numerals refer to similar parts throughout the drawings.

BEST MODE FOR CARRYING OUT THE INVENTION

A fuel charging system of the type in which the nitrous oxide precooler is used is shown diagrammatically in FIG. 1 and is indicated generally at 1. Fuel charging system 1 includes a base plate 2 which is mounted in a usual manner between the carburetor and intake manifold (not shown) of the vehicle engine and is connected to the vehicle fuel tank 3 through a fuel delivery line 4. Delivery line 4 is connected to a fuel spray bar 5 spaced with respect to a nitrous oxide spray bar 6 in a usual manner on base plate 2. A solenoid actuated control valve 7 is mounted in fuel delivery line 4 and is controlled remotely by a switch 8 connected thereto by an electric line 9. Switch 8 is located within the vehicle and is actuated by the vehicle driver as required. Spray bar 6 is connected to a usual nitrous oxide supply cylinder 10 by a supply line 11.

The nitrous oxide precooler is indicated generally at 15, and is shown in detail in FIG. 2. Precooler 15 is located between spray bar 6 and nitrous oxide supply cylinder 10 and is connected to the nitrous oxide supply by line 11. Precooler 15 includes a nitrous oxide supply conduit 16 which is connected to cylinder 10 through a manually controlled valve 17 mounted in the top opening or neck of cylinder 10. A manually rotatable handle 18 is mounted on valve 17 for discharging the pressurized liquid nitrous oxide in cylinder 10 into conduit 16.

Conduit 16 is connected to a manifold indicated generally at 20, which has a main cylindrical body 21 and a reduced diameter cylindrical end 22 over which a hose 23 is telescopically mounted and secured by clamping band 24. A raised annular rib 26 is formed on reduced diameter end 22 of manifold 20 to provide a secure fit with hose 23. Manifold 20 is formed with a hollow interior 25 as shown in FIG. 5. Circular inner end wall 27 of manifold end 22 is formed with a central opening 28 and a secondary opening 29 (FIG. 3). Nitrous oxide supply conduit 16 is connected by a coupler 30 to end wall 27 and aligns with central opening 28 for communicating with hollow interior 25 of the manifold.

The other end of hose 23 opposite of manifold 20, is closed by an orifice block indicated generally at 32 (FIGS. 2 and 4). Orifice block 32 includes a pair of semicylindrical shaped members 33 and 34, each being formed with a discharge hole 36 and a semicircular shaped central opening 36. Openings 36 align with each other when telescopically mounted within open end 37 of hose 23 to abut and form a circular shaped central opening indicated generally at 38, through which conduit 16 extends. Semicircular members 33 and 34 are maintained in abutting relationship telescopically mounted within open hose end 37 by a clamping ring 40. Ring 40 insures that members 33 and 34 are tightly clamped about conduit 16 so as to form a generally tight seal therebetween.

A nitrous oxide discharge solenoid actuated valve 42 is mounted in nitrous oxide supply line 11 and is connected to manifold 20 by a coupler 43 (FIGS. 2 and 5). A similar solenoid actuated valve 45 also is connected to manifold 20 by a coupler 46. A purge line 47 extends from solenoid valve 45 and enters through the outer end wall 48 of solenoid 20 and extends through chamber 25 and through secondary opening 29 formed in inner end wall 27 of manifold 20 (FIG. 3) and terminates within annular shaped chamber 50 formed by hose 23 about nitrous oxide supply conduit 16. Solenoid actuated valves 42 and 45 are connected to a manually operated switch 51 by control wires 52 and 53, respectively. Switch 51 will be located within the driver's compartment of the vehicle usually closely adjacent to fuel supply switch 8. As shown in the drawings, solenoids 42 and 45 are connected through wires 52 and 53 by a common control wire 54 to switch 51. If desired, a pair of manually actuated switches may be located within the driver's compartment for individually controlling valves 42 and 45 instead of the single switch 51 shown in FIG. 1.

The operation and manner of use of fuel charging system 1 incorporating the unique nitrous oxide precooler is set forth below. During the course of a race, cylinder valve 18 will be in an open position with solenoid actuated valves 7, 42, and 45 being in a closed position. Liquid nitrous oxide from cylinder 10 which preferably is at a pressure of approximately 900 psi, will flow through supply conduit 16 and into interior 25 of manifold 20 where it is prevented from further discharge by closed valves 42 and 45. The temperature of the liquid nitrous oxide located within manifold interior 25 and conduit 16 will increase and begin to vaporize over a period of time during the race since it is no longer contained within high pressure cylinder 10. Also the nitrous oxide is used only at certain instances during the race and only for short durations of time, and therefore remains dormant in the conduit and manifold until needed.

When the driver wishes to obtain a sudden burst of power for the engine during the race, he will actuate switch 51 which will immediately open valve 45 enabling the gaseous nitrous oxide within conduit 16 and manifold interior 25 to flow through the valve and purge conduit 47 and into cooling chamber 50 as indicated by arrow A, FIG. 2. This purged nitrous oxide gas upon entering chamber 50 will expand causing a cooling effect in the chamber which will lower the temperature of the nitrous oxide within conduit 16 surrounded by cooling chamber 50. This cooling action will maintain the nitrous oxide in liquid form within conduit 16 as well as reducing its temperature. Solenoid valve 42 may have a built in time delay whereby it will open after a relatively short period of time after opening of valve 45. This time delay will be sufficient to purge conduit 16 of any gaseous nitrous oxide and provide cooling of the remaining liquid nitrous oxide therein before valve 42 is opened and the liquid nitrous oxide flows through line 11 and into spray bar 6.

Alternatively, another manually actuated switch (not shown) may be associated with switch 51 and manually operated by the driver when desired after purging of conduit 16. The driver will also actuate simultaneously or in conjunction with switch 51, switch 8 which will open valve 7 permitting a flow of fluid into spray bar 5 which is mixed with the sprayed nitrous oxide being emitted by spray bar 6. This procedure can be performed in a relatively short time such as a fraction of a second or more. This insures that only liquid nitrous oxide will flow through line 11 and into the vehicle engine to achieve a proper mixture with the incoming fuel instead of any vapors flowing therein. Also, instead of discharging the nitrous oxide vapors to the surrounding atmosphere as heretofore done with prior fuel charging systems, the vapors are returned into cooling chamber 50 where they maintain the incoming nitrous oxide in liquid form, and in addition will lower the temperature of the nitrous oxide enabling more of the liquid nitrous oxide to move through conduit 16 and into spray bar 6.

Orifice block 32 which is located at the opposite end of hose 23 from manifold 20 enables the spent nitrous oxide vapors to be discharged from within chamber 50 as more vapors are injected into the chamber through conduit 47. This enables a continuous supply of expanded nitrous oxide vapors to enter the chamber and cool the liquid nitrous oxide as it moves through conduit 16 and valve 42 and into line 11. In the preferred embodiment, hose 23 will have a length of approximately 3 feet which will provide a sufficient area about conduit 16 for cooling the incoming nitrous oxide before passing through valve 42 and into delivery line 11. However, this distance may vary depending upon the particular high performance vehicle in which the precooler is installed.

Accordingly, an improved nitrous oxide precooler 15 cools the liquid nitrous oxide before it passes through solenoid valve 42 and into spray bar 6 thereby increasing its density and allowing more of the nitrous oxide to pass through the system for a given line pressure. It also liquifies any nitrous oxide vapors which may have formed within cylinder 10, conduit 16 and manifold 20 as it flows through conduit 16 toward spray bar 6. Precooler 15 is formed by an extremely simple and inexpensive, yet highly efficient arrangement of readily available components shown particularly in FIG. 2, the main feature of which is the use of a hose or other similar device which will form a cooling chamber about conduit 16 in combination with the injection of the gaseous nitrous oxide purged from the conduit and returning it and expanding it into the cooling chamber.

Accordingly, the nitrous oxide precooler is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the nitrous oxide precooler is constructed and used, the characteristics of the construction, and the advantageous, new and useful results obtained; the new and useful structures, devices, elements, arrangements, parts, and combinations, are set forth in the appended claims.

What is claimed is:

1. A nitrous oxide precooler for a fuel charging system for a vehicle engine including:
   (a) a container holding a supply of pressurized liquid nitrous oxide;
   (b) conduit means for delivering nitrous oxide from the container to the vehicle engine;
   (c) first valve means for controlling the flow of nitrous oxide from the conduit means to the engine;
   (d) jacket means surrounding a portion of the conduit means for forming a cooling chamber to receive gaseous nitrous oxide for maintaining the nitrous oxide in the conduit means in a liquid state; and
   (e) second valve means communicating with the conduit means and cooling chamber for purging any gaseous nitrous oxide from the conduit means and injecting it into said cooling chamber before actuation of the first valve means.

2. The nitrous oxide precooler defined in claim 1 in which a manifold is located at one end of the cooling chamber; in which the conduit means is connected to the manifold whereby gaseous and liquid nitrous oxide in the conduit means flow into the manifold; and in which the first and second valve means are connected to the manifold for removing the liquid and gaseous nitrous oxide from the manifold and delivering it to the vehicle engine and cooling chamber, respectively.

3. The nitrous oxide precooler defined in claim 2 in which the first and second valve means are solenoid actuated valves operated remotely by the vehicle driver.

4. The nitrous oxide precooler defined in claim 2 in which the manifold has a hollow interior; and in which a purge line extends from an outlet of the second valve means through the manifold interior and into the cooling chamber for injecting the purged gaseous nitrous oxide into said cooling chamber.

5. The nitrous oxide precooler defined in claim 4 in which the jacket means includes a section of hose telescopically mounted about a portion of the conduit means; and in which the hose is attached at one end to the manifold at the other end to an orifice block.

6. The nitrous oxide precooler defined in claim 5 in which the orifice block is formed with a discharge hole for venting spent gaseous nitrous oxide from the cooling chamber; and in which the orifice block also is formed with an opening through which the conduit means enters said cooling chamber.

7. The nitrous oxide precooler defined in claim 6 in which the orifice block includes a pair of semicircular members each formed with a discharge hole and a semicircular opening, which openings align with each other to form the conduit means inlet opening; and in which a clamp telescopically mounts the semicircular members within an open end of the hose.

8. The nitrous oxide precooler defined in claim 5 in which the hose is telescopically mounted on a cylinderical portion of the manifold and secured thereto by a clamp.

9. The nitrous oxide precooler defined in claim 1 in which the nitrous oxide container maintains the liquid nitrous oxide at a pressure of approximately 900 psi.

10. The nitrous oxide precooler defined in claim 1 in which an injection tube extends from the first valve means to the vehicle engine.

11. An improved high performance vehicle fuel charging system of the type having a cylinder of pressurized liquid nitrous oxide, a supply conduit extending from the cylinder to the vehicle engine, and a remotely controlled valve mounted in the conduit for controlling the flow of liquid nitrous oxide from the cylinder through the conduit to the vehicle engine; said improvement including means for forming a cooling chamber about at least a portion of the supply conduit; and purge means communicating with the conduit and cooling chamber forming means for removing gaseous nitrous oxide from the conduit and injecting it into the cooling chamber forming means before the valve permits the flow of liquid nitrous oxide to the engine.

12. The improved fuel charging system defined in claim 11 in which the cooling chamber forming means includes a sleeve-like member mounted about the conduit; in which the sleeve-like member is closed at one end by a manifold and at an opposite end by an orifice block; and in which the supply conduit communicates with the manifold.

13. The improved fuel charging system defined in claim 12 in which the orifice block is provided with a spent gaseous nitrous oxide discharge opening; in which the purge means include a tube for purging gaseous nitrous oxide from the supply conduit and manifold and injecting it into the cooling chamber.

* * * * *